(12) United States Patent
Lo et al.

(10) Patent No.: US 11,776,767 B2
(45) Date of Patent: Oct. 3, 2023

(54) FABRICATION METHODS FOR SUPERCAPACITOR ELECTRODE INCLUDING SILICON DIOXIDE MICROSPHERE

(71) Applicant: NATIONAL CHIN-YI UNIVERSITY OF TECHNOLOGY, Taichung (TW)

(72) Inventors: An-Ya Lo, Taichung (TW); Chia-Chia Chang, Tainan (TW)

(73) Assignee: NATIONAL CHIN-YI UNIVERSITY OF TECHNOLOGY, Taichung (TW)

( * ) Notice: Subject to any disclaimer, the term of this patent is extended or adjusted under 35 U.S.C. 154(b) by 299 days.

(21) Appl. No.: 16/908,715

(22) Filed: Jun. 22, 2020

(65) Prior Publication Data

US 2021/0319960 A1    Oct. 14, 2021

(30) Foreign Application Priority Data

Apr. 14, 2020   (TW) ................. 109112530

(51) Int. Cl.
| | |
|---|---|
| H01G 11/86 | (2013.01) |
| H01G 11/34 | (2013.01) |
| H01G 11/46 | (2013.01) |
| H01G 11/36 | (2013.01) |
| H01G 11/24 | (2013.01) |
| B05D 3/12 | (2006.01) |
| H01G 11/38 | (2013.01) |
| B05D 3/02 | (2006.01) |
| B05D 1/26 | (2006.01) |
| B05D 5/12 | (2006.01) |

(52) U.S. Cl.
CPC .............. *H01G 11/86* (2013.01); *B05D 3/12* (2013.01); *H01G 11/24* (2013.01); *H01G 11/34* (2013.01); *H01G 11/36* (2013.01); *H01G 11/38* (2013.01); *H01G 11/46* (2013.01); *B05D 1/26* (2013.01); *B05D 3/0254* (2013.01); *B05D 5/12* (2013.01); *B05D 2202/35* (2013.01)

(58) Field of Classification Search
CPC ........ H01G 11/24; H01G 11/34; H01G 11/36; H01G 11/46; H01G 11/86; B05D 1/26; B05D 3/0254; B05D 5/12; B05D 2202/35
USPC ................................... 427/79–81, 565, 568
See application file for complete search history.

(56) References Cited

U.S. PATENT DOCUMENTS

| | | | | |
|---|---|---|---|---|
| 2004/0047798 | A1* | 3/2004 | Oh ...................... | C04B 38/0022 423/445 R |
| 2011/0253643 | A1* | 10/2011 | Polshettiwar ............ | B01J 23/38 977/773 |
| 2015/0187516 | A1* | 7/2015 | Miyauchi ............... | H01M 4/134 361/502 |

FOREIGN PATENT DOCUMENTS

| | | | | |
|---|---|---|---|---|
| CN | 1452592 A | * | 10/2003 | ............. C01B 32/00 |
| CN | 104591121 A | * | 5/2015 | |
| CN | 107093526 A | * | 8/2017 | |

(Continued)

*Primary Examiner* — Brian K Talbot
(74) *Attorney, Agent, or Firm* — CKC & Partners Co., LLC

(57) ABSTRACT

A fabrication method of a supercapacitor electrode including silicon dioxide microsphere is provided in the present disclosure. The fabrication method includes steps as follows. A slurry is provided, a coating step is performed and a drying step is performed. The slurry includes a plurality of silicon dioxide microspheres, a carbon material, a conductive agent, a binder and a solvent. In the coating step, the slurry is coated onto a substrate to form a coated piece. In the drying step, the coated piece is dried to form the supercapacitor electrode including silicon dioxide microsphere.

4 Claims, 13 Drawing Sheets

(56) References Cited

FOREIGN PATENT DOCUMENTS

| CN | 107658150 | A | * | 2/2018 | |
|---|---|---|---|---|---|
| CN | 108417404 | A | * | 8/2018 | |
| CN | 109411242 | A | * | 3/2019 | ............ H01G 11/26 |
| CN | 110148524 | A | * | 8/2019 | ............ H01G 11/24 |
| CN | 110197908 | A | * | 9/2019 | |
| CN | 111180745 | A | * | 5/2020 | ........... H01M 12/08 |
| TW | 200902142 | A | | 1/2009 | |
| TW | 201224085 | A | | 6/2012 | |

* cited by examiner

FABRICATION METHODS FOR SUPERCAPACITOR ELECTRODE INCLUDING SILICON DIOXIDE MICROSPHERE

RELATED APPLICATIONS

This application claims priority to Taiwan Application Serial Number 109112530, filed Apr. 14, 2020, which is herein incorporated by reference.

BACKGROUND

Technical Field

The present disclosure relates to a fabrication method of a capacitor electrode. More particularly, the present disclosure relates to a fabrication method of a supercapacitor electrode including silicon dioxide microsphere.

Description of Related Art

A capacitor is an electronic component for storing electrical energy. Compared to a conventional battery, the capacitor has higher charge and discharge rates and greater cycle life, which gives the capacitor a promising future for being a substitute for the battery. Furthermore, the supercapacitor has higher energy density than a conventional capacitor, and has higher power density than a conventional battery. Therefore, the supercapacitor has the best potential among the various capacitors.

The supercapacitor includes two electrodes and an electrolyte between the two electrodes. When the supercapacitor is being charged, electric charges accumulate at the interfaces between the electrodes and the electrolyte, in order to store electrical energy. Thus, properties of the electrodes and the electrolyte, such as material properties, contact area between the electrodes and the electrolyte and affinity thereof, affect the charging and discharging performance of the supercapacitor, which determines the versatility of the supercapacitor.

In this regard, how to improve the charging and discharging properties of the supercapacitor has become a pursuit target for vendors.

SUMMARY

According to one aspect of the present disclosure, a fabrication method of a supercapacitor electrode including silicon dioxide microsphere includes steps as follows. A slurry is provided, a coating step is performed and a drying step is performed. The slurry includes a plurality of silicon dioxide microspheres, a carbon material, a conductive agent, a binder and a solvent. In the coating step, the slurry is coated onto a substrate to form a coated piece. In the drying step, the coated piece is dried to form the supercapacitor electrode including silicon dioxide microsphere.

According to another aspect of the present disclosure, a supercapacitor electrode including silicon dioxide microsphere made by the aforementioned fabrication method is provided.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
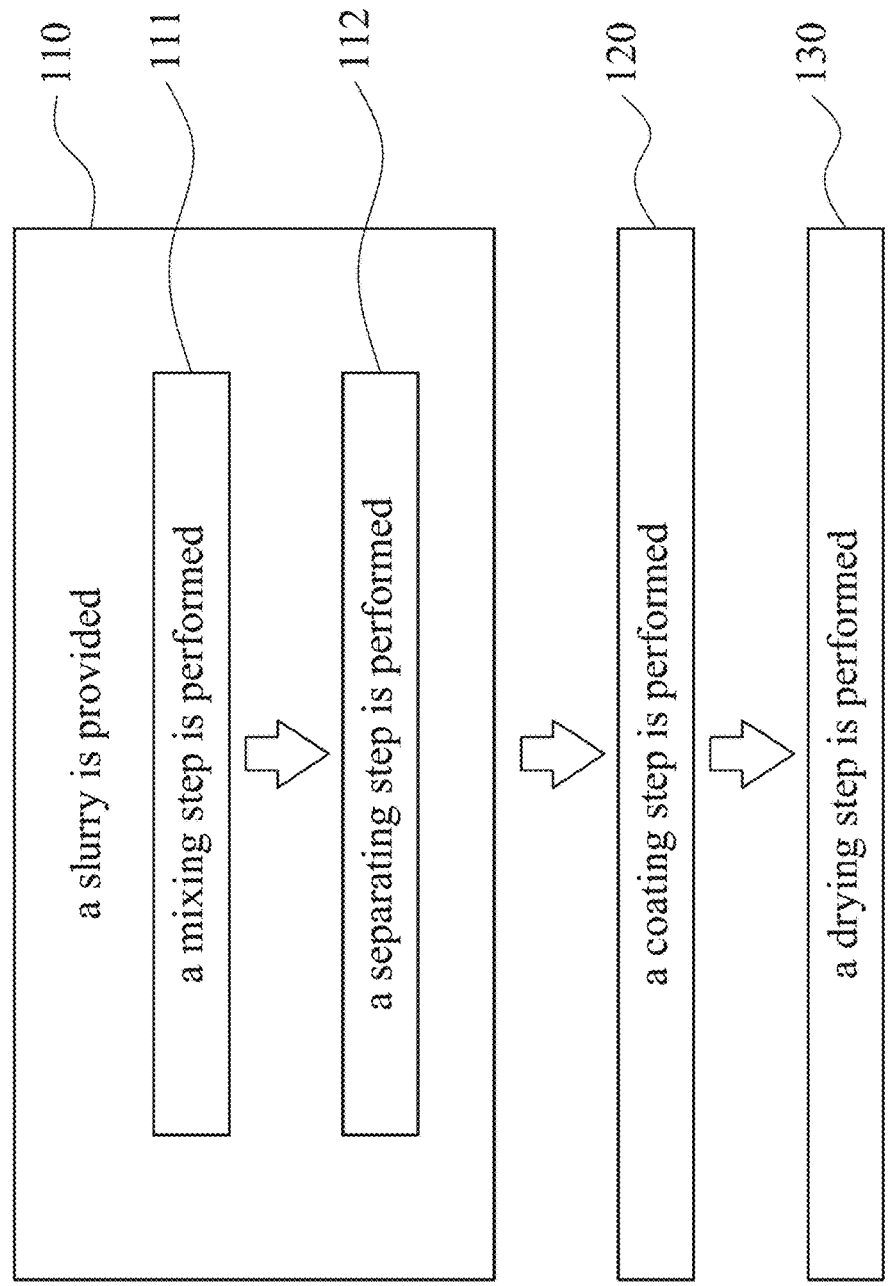
FIG. 1 is a flow chart of a fabrication method of a supercapacitor electrode including silicon dioxide microsphere according to one aspect of the present disclosure.

Please refer to FIG. 1. FIG. 1 is a flow chart of a fabrication method of a supercapacitor electrode including silicon dioxide microsphere 100 according to one aspect of the present disclosure. The fabrication method of the supercapacitor electrode including silicon dioxide microsphere 100 includes Step 110, Step 120 and Step 130.

In Step 110, a slurry is provided. The slurry includes a plurality of silicon dioxide microspheres, a carbon material, a conductive agent, a binder and a solvent.

The diameter of each of the silicon dioxide microspheres is defined as D, and the condition of $0 < D \leq 300$ nm can be satisfied. Through adding the silicon dioxide microspheres with proper size, the silicon dioxide microspheres can be evenly distributed in the supercapacitor electrode including silicon dioxide microsphere, without damaging the electrode structure. The affinity of the electrode and the electrolyte is enhanced by adding the silicon dioxide microspheres, which makes the electrolyte permeate into the electrode uniformly. Thus, the incidence of structural defect caused by the electrode working decreases, and the charging and discharging properties of the supercapacitor are improved.

The weight ratio of the silicon dioxide microspheres to the carbon material can be 1:100 to 30:100. The affinity of the electrode and the electrolyte can be barely enhanced with insufficient silicon dioxide microspheres. On the other hand, movement of electrons during charging and discharging is hindered with excessive silicon dioxide microspheres due to the non-conductivity thereof.

The carbon material can be an activated carbon material, a mesoporous carbon material or a graphene material. The surface area of the electrode contacting the electrolyte becomes larger because those aforementioned materials have large specific surface area. Hence, more electric charges can be stored and the capacitance of the electrode increases. The mesoporous carbon material can be a mesoporous carbon material including cerium dioxide, or the graphene material can be a graphene material including manganese dioxide. By adding cerium dioxide or manganese dioxide, the electrochemical activity of the electrode is improved, leading to a higher capacitance of the electrode.

The conductive agent, the binder and the solvent can be carbon black, polyvinylidene difluoride and 1-methylpyrrolidin-2-one, respectively. The weight ratio of the carbon material to the conductive agent to the binder can be 8:1:1, so as to fabricate the supercapacitor electrode including silicon dioxide microsphere with good structure and conductivity.

Please notice that, Step 110 can further include Step 111 and Step 112. In Step 111, a mixing step is performed to add the silicon dioxide microspheres, the carbon material, the conductive agent and the binder into the solvent, in order to form a mixture.

In Step 112, a dispersing step is performed to stir and sonicate the mixture to form the slurry. The hydrophilicity of the electrode can be more uniformly enhanced as the silicon dioxide microspheres being distributed more evenly therein. Therefore, the mixture can be stirred for 30 minutes and sonicated for 30 minutes under room temperature, so as to ensure that the silicon dioxide microspheres are distributed evenly in the slurry.

In Step 120, a coating step is performed to coat the slurry onto a substrate to form a coated piece. The substrate is not only for supporting the slurry, but also a medium for electrical conduction. Thus, the material of the substrate can be conductive metals. In the present disclosure, titanium is selected as the material of the substrate.

In Step 130, a drying step is performed to dry the coated piece. In this regard, the solvent in the coated piece is removed to form the supercapacitor electrode including silicon dioxide microsphere. The coated piece can be dried under a vacuum condition and 100° C. for 30 minutes to make sure the solvent therein is fully removed.

A supercapacitor electrode including silicon dioxide microsphere, which is made by the aforementioned fabrication method 100, is provided according to another aspect of the present disclosure.

The properties of the supercapacitor electrodes including silicon dioxide microsphere are measured and analyzed in the following tests. The supercapacitor electrodes including silicon dioxide microsphere are prepared with different sizes of silicon dioxide microspheres, different ratios of silicon dioxide microspheres or different carbon materials. The electrochemical properties in every test are measured by the potentiostat.

1. Effect of Sizes and Ratios of Silicon Dioxide Microspheres on Capacitance

The supercapacitor electrodes including silicon dioxide microsphere in the following tests are prepared from a CMK-3 type mesoporous carbon material and silicon dioxide microspheres of 100, 200, 300 or 400 nm in diameter. The weight ratio of the silicon dioxide microspheres to the mesoporous carbon material is 1:100, 2:100, 4:100, 6:100, 8:100, 10:100 or 15:100. The specific capacitances of the prepared electrodes are measured to find out the effect of sizes and ratios of the silicon dioxide microspheres thereon.

Moreover, a $CS_0$ electrode without silicon dioxide microsphere is also fabricated as a Comparison 1 from the mesoporous carbon material. The specific capacitance of the Comparison 1 is 133 F/g, which is compared to the measuring result of the supercapacitor electrodes including silicon dioxide microsphere.

1-1. Test 1: Add Silicon Dioxide Microspheres of 100 nm

In Test 1, the specific capacitances of the supercapacitor electrodes including silicon dioxide microsphere of 100 nm and the Comparison 1 are compared. In this test, Examples 1-7 are fabricated with the weight ratio of the silicon dioxide microspheres to the mesoporous carbon material being 1:100, 2:100, 4:100, 6:100, 8:100, 10:100 and 15:100, respectively. The specific capacitances and the electrode numbers of Comparison 1 and Examples 1-7 are listed in Table 1 below.

TABLE 1

Specific Capacitances of Comparison 1 and Examples 1-7

| Example | Electrode Number | Specific Capacitance (F/g) |
|---|---|---|
| Comparison 1 | $CS_0$ | 133 |
| Example 1 | $CS_{100-1}$ | 179 |
| Example 2 | $CS_{100-2}$ | 200 |
| Example 3 | $CS_{100-4}$ | 184 |
| Example 4 | $CS_{100-6}$ | 298 |
| Example 5 | $CS_{100-8}$ | 145 |
| Example 6 | $CS_{100-10}$ | 126 |
| Example 7 | $CS_{100-15}$ | 117 |

Figure 2:
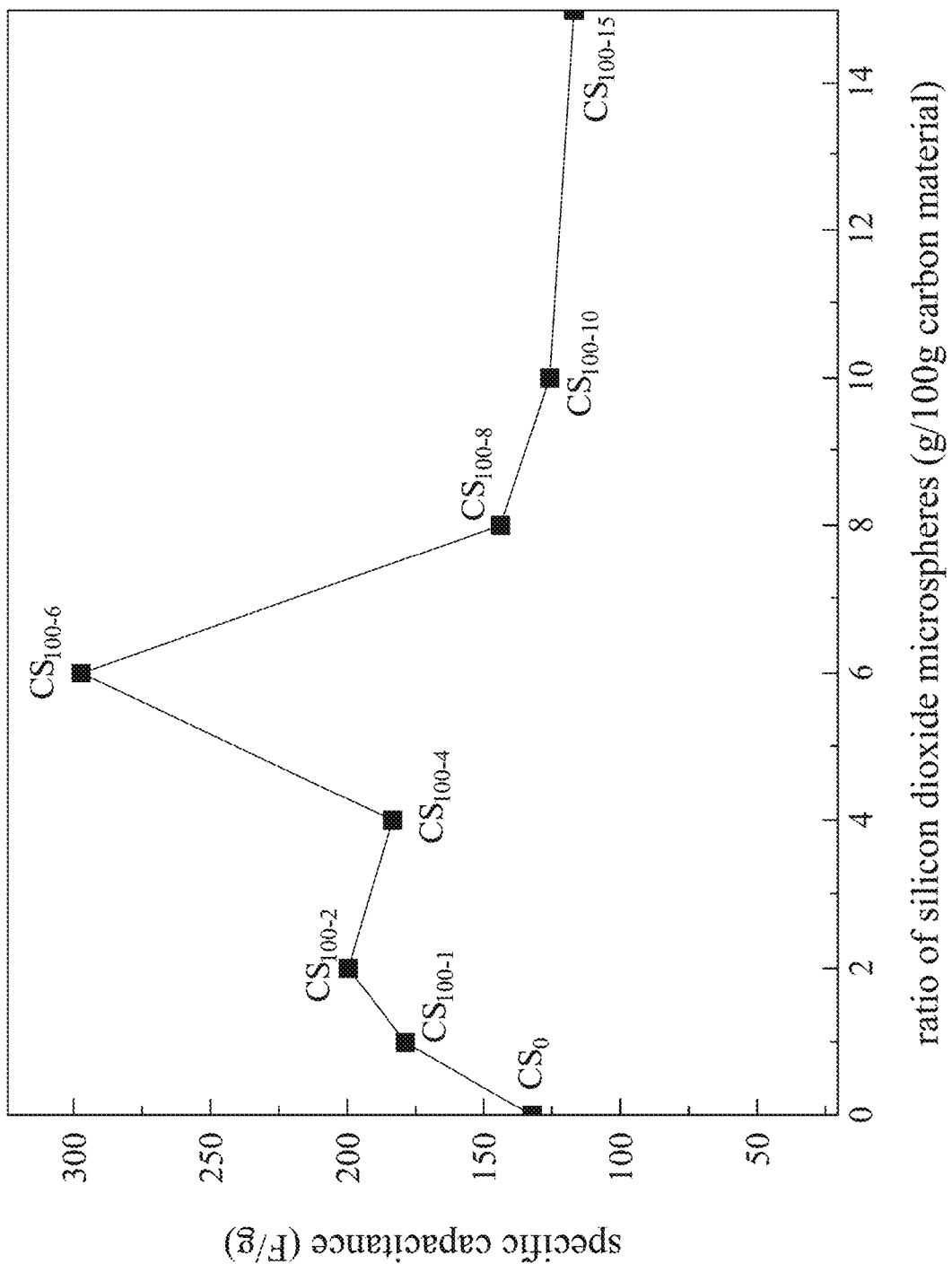
FIG. 2 is a graph showing the relationship between specific capacitances and ratios of silicon dioxide microspheres according to Test 1.
Figure 3A:
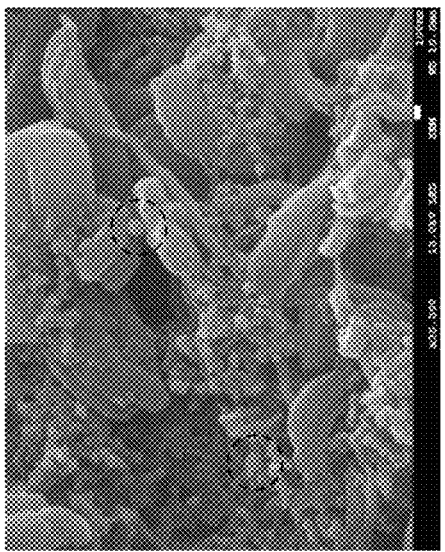
FIG. 3A is a scanning electron microscopic image of Example 1.
Figure 3B:
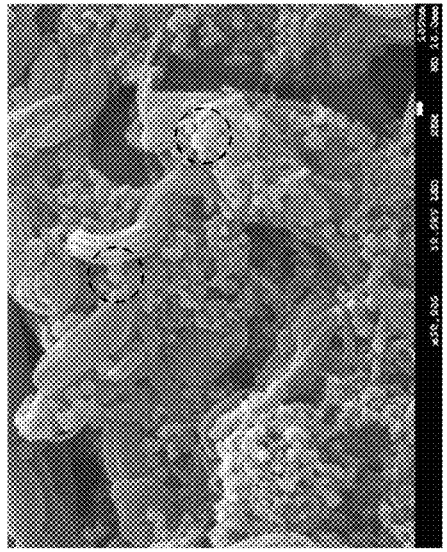
FIG. 3B is a scanning electron microscopic image of Example 2.
Figure 3C:
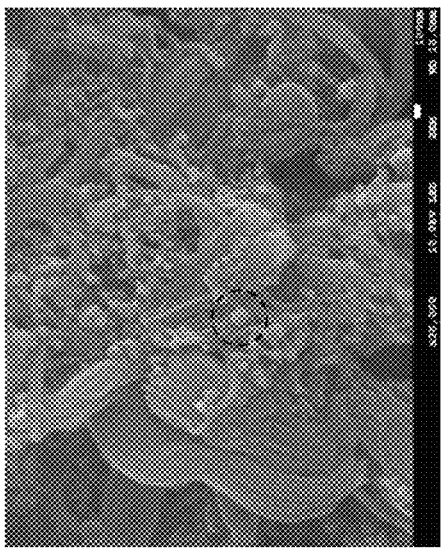
FIG. 3C is a scanning electron microscopic image of Example 3.
Figure 3D:
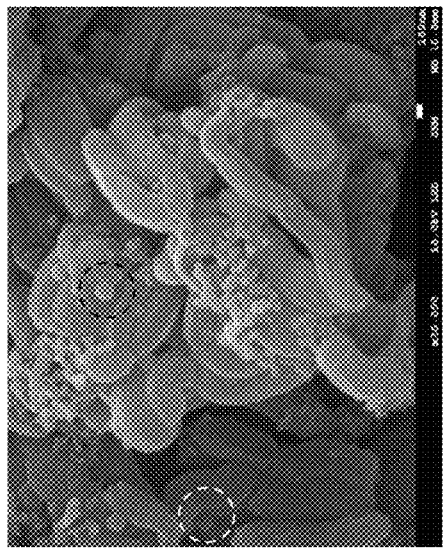
FIG. 3D is a scanning electron microscopic image of Example 4.
Figure 3F:
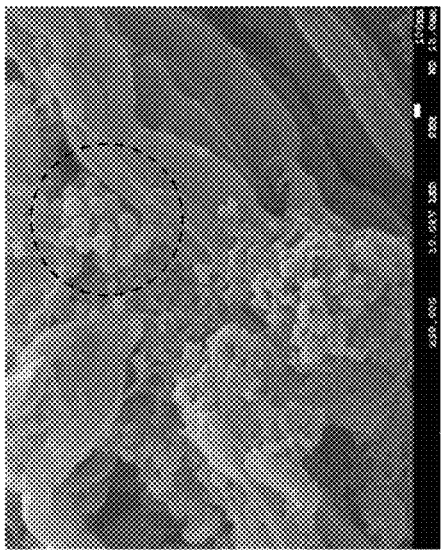
FIG. 3F is a scanning electron microscopic image of Example 6.
Figure 3E:
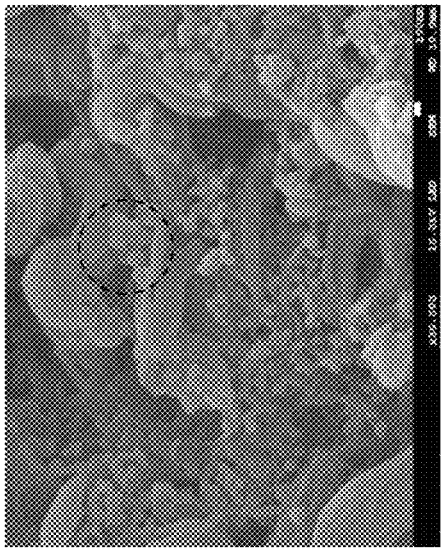
FIG. 3E is a scanning electron microscopic image of Example 5.
Figure 3G:
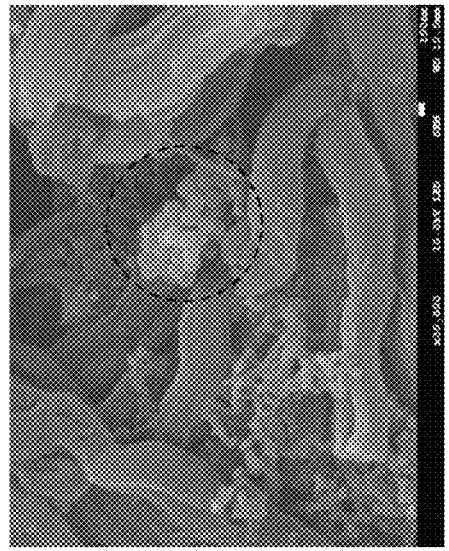
FIG. 3G is a scanning electron microscopic image of Example 7.

Please refer to FIG. 2. FIG. 2 is a graph showing the relationship between specific capacitances and ratios of silicon dioxide microspheres according to Test 1. The result of Test 1 shows that the specific capacitance increases by adding the silicon dioxide microspheres of 100 nm. Furthermore, the specific capacitance significantly increases to 298 F/g as the weight ratio of the silicon dioxide microspheres to the mesoporous carbon material being 6:100, i.e. Example 4, which means the capability of storing the electric charges of the supercapacitor electrode including silicon dioxide microsphere is greatly improved.

In addition, it is observed that the specific capacitance generally increases as the ratio of the silicon dioxide microspheres increasing, but decreases when the weight ratio of the silicon dioxide microspheres to the mesoporous carbon material is higher than 8:100. Please refer to FIGS. 3A-3G. FIGS. 3A-3G are scanning electron microscopic images of Examples 1-7, respectively, and the location of the silicon dioxide microspheres in each image is marked by a dashed circle. FIGS. 3A-3G show that the silicon dioxide microspheres apparently agglomerate in Examples 5-7, which hinders the movement of electrons. Thus, excessive silicon dioxide microspheres may result in the decrease of capacitance.

1-2. Test 2: Add Silicon Dioxide Microspheres of 200 nm

In Test 2, the specific capacitances of the supercapacitor electrodes including silicon dioxide microsphere of 200 nm and the Comparison 1 are compared. In this test, Examples 8-14 are fabricated following the same ratio sequence in Test 1. The specific capacitances and the electrode numbers of Comparison 1 and Examples 8-14 are listed in Table 2 below.

TABLE 2

Specific Capacitances of Comparison 1 and Examples 8-14

| Example | Electrode Number | Specific Capacitance (F/g) |
|---|---|---|
| Comparison 1 | $CS_0$ | 133 |
| Example 8 | $CS_{200-1}$ | 158 |
| Example 9 | $CS_{200-2}$ | 162 |
| Example 10 | $CS_{200-4}$ | 168 |
| Example 11 | $CS_{200-6}$ | 194 |
| Example 12 | $CS_{200-8}$ | 240 |
| Example 13 | $CS_{200-10}$ | 160 |
| Example 14 | $CS_{200-15}$ | 145 |

Figure 4:
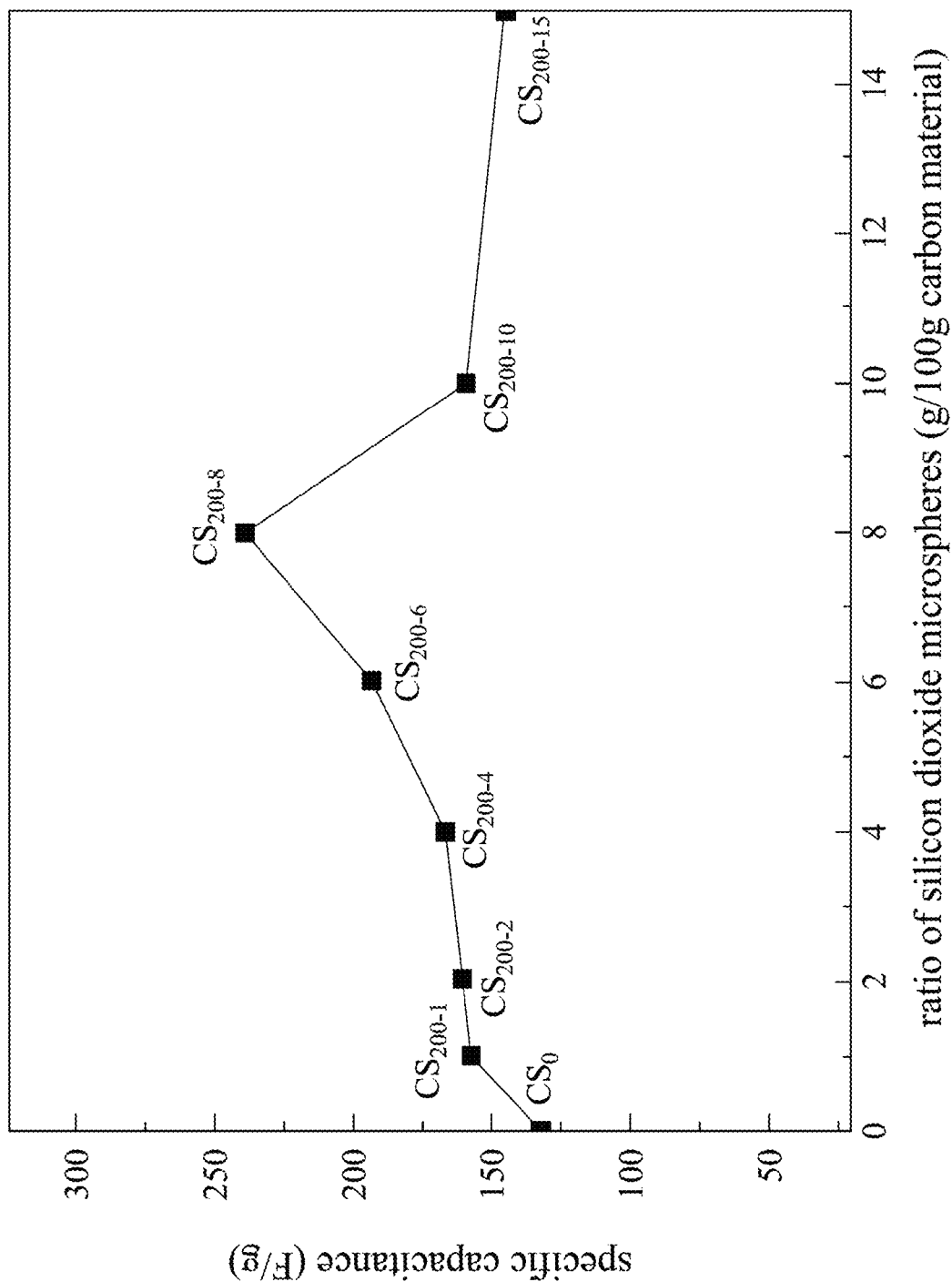
FIG. 4 is a graph showing the relationship between specific capacitances and ratios of silicon dioxide microspheres according to Test 2.

Please refer to FIG. 4. FIG. 4 is a graph showing the relationship between specific capacitances and ratios of silicon dioxide microspheres according to Test 2. The result of Test 2 shows that the specific capacitance increases by adding the silicon dioxide microspheres of 200 nm. Furthermore, the specific capacitance significantly increases to 240 F/g as the weight ratio of the silicon dioxide microspheres to the mesoporous carbon material being 8:100, i.e. Example 12.

1-3. Test 3: Add Silicon Dioxide Microspheres of 300 nm

In Test 3, the specific capacitances of the supercapacitor electrodes including silicon dioxide microsphere of 300 nm and the Comparison 1 are compared. In this test, Examples 15-21 are fabricated following the same ratio sequence in Test 1. The specific capacitances and the electrode numbers of Comparison 1 and Examples 15-21 are listed in Table 3 below.

TABLE 3

Specific Capacitances of Comparison 1 and Examples 15-21

| Example | Electrode Number | Specific Capacitance (F/g) |
|---|---|---|
| Comparison 1 | $CS_0$ | 133 |
| Example 15 | $CS_{300-1}$ | 133 |
| Example 16 | $CS_{300-2}$ | 135 |
| Example 17 | $CS_{300-4}$ | 136 |
| Example 18 | $CS_{300-6}$ | 125 |
| Example 19 | $CS_{300-8}$ | 163 |
| Example 20 | $CS_{300-10}$ | 197 |
| Example 21 | $CS_{300-15}$ | 160 |

Figure 5:
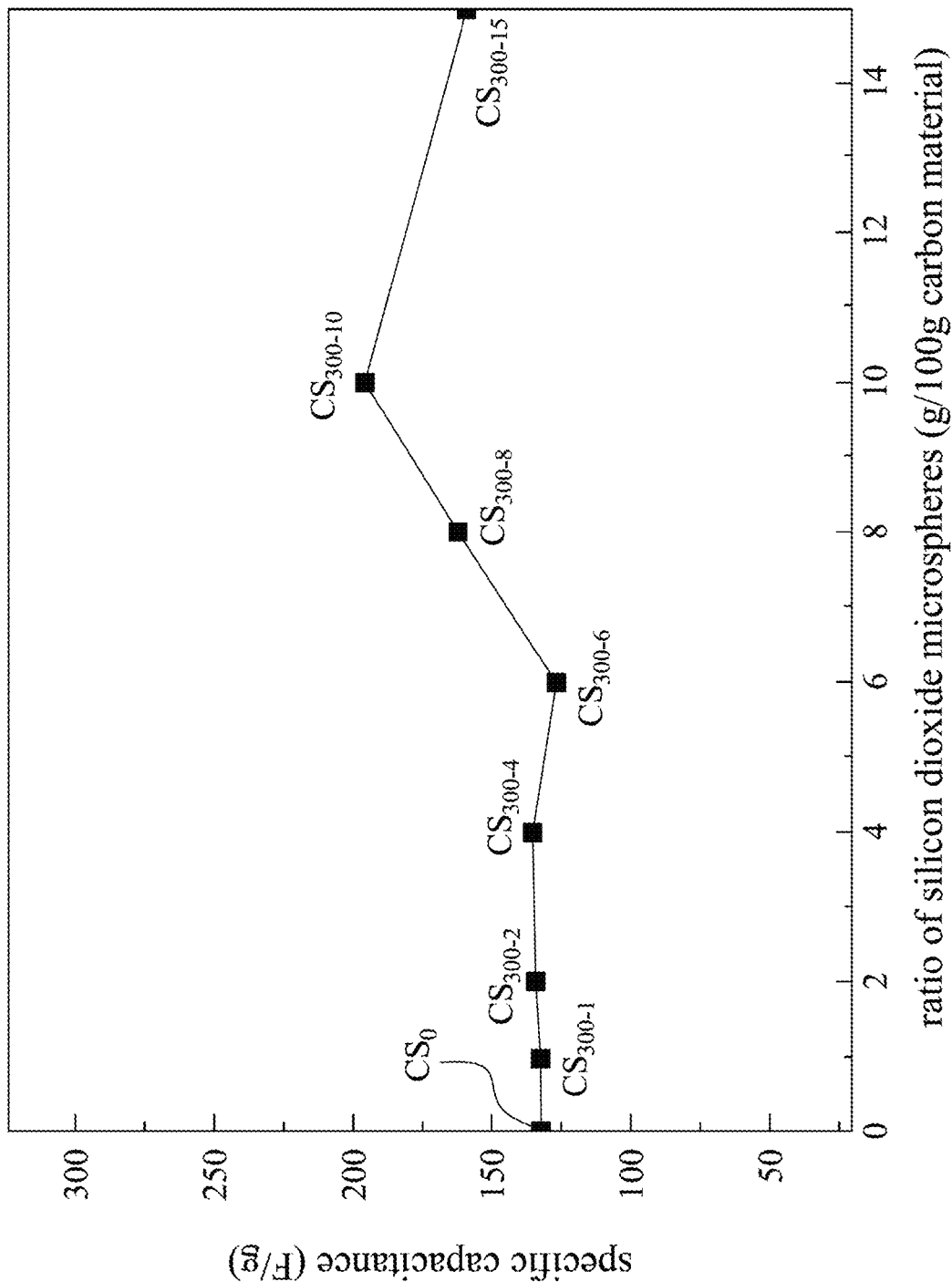
FIG. 5 is a graph showing the relationship between specific capacitances and ratios of silicon dioxide microspheres according to Test 3.

Please refer to FIG. 5. FIG. 5 is a graph showing the relationship between specific capacitances and ratios of silicon dioxide microspheres according to Test 3. The result of Test 3 shows that the specific capacitance increases by adding the silicon dioxide microspheres of 300 nm. Furthermore, the specific capacitance significantly increases to 197 F/g as the weight ratio of the silicon dioxide microspheres to the mesoporous carbon material being 10:100, i.e. Example 20. Besides, from the results of Tests 1-3, the specific capacitance increases the most when adding the silicon dioxide microspheres of 100 nm, followed by 200 nm and then 300 nm. According to the results, it is realized that the specific capacitance increases more when the diameter of the silicon dioxide microsphere gets smaller.

1-4. Test 4: Add Silicon Dioxide Microspheres of 400 nm

In Test 4, the specific capacitances of the supercapacitor electrodes including silicon dioxide microsphere of 400 nm and the Comparison 1 are compared. In this test, Comparisons 2-8 are fabricated following the same ratio sequence in Test 1. The specific capacitances and the electrode numbers of Comparisons 1-8 are listed in Table 4 below.

TABLE 4

Specific Capacitances of Comparisons 1-8

| Example | Electrode Number | Specific Capacitance (F/g) |
|---|---|---|
| Comparison 1 | $CS_0$ | 133 |
| Comparison 2 | $CS_{400-1}$ | 116 |
| Comparison 3 | $CS_{400-2}$ | 71 |
| Comparison 4 | $CS_{400-4}$ | 36 |
| Comparison 5 | $CS_{400-6}$ | 32 |
| Comparison 6 | $CS_{400-8}$ | 32 |
| Comparison 7 | $CS_{400-10}$ | 57 |
| Comparison 8 | $CS_{400-15}$ | 77 |

Figure 6:
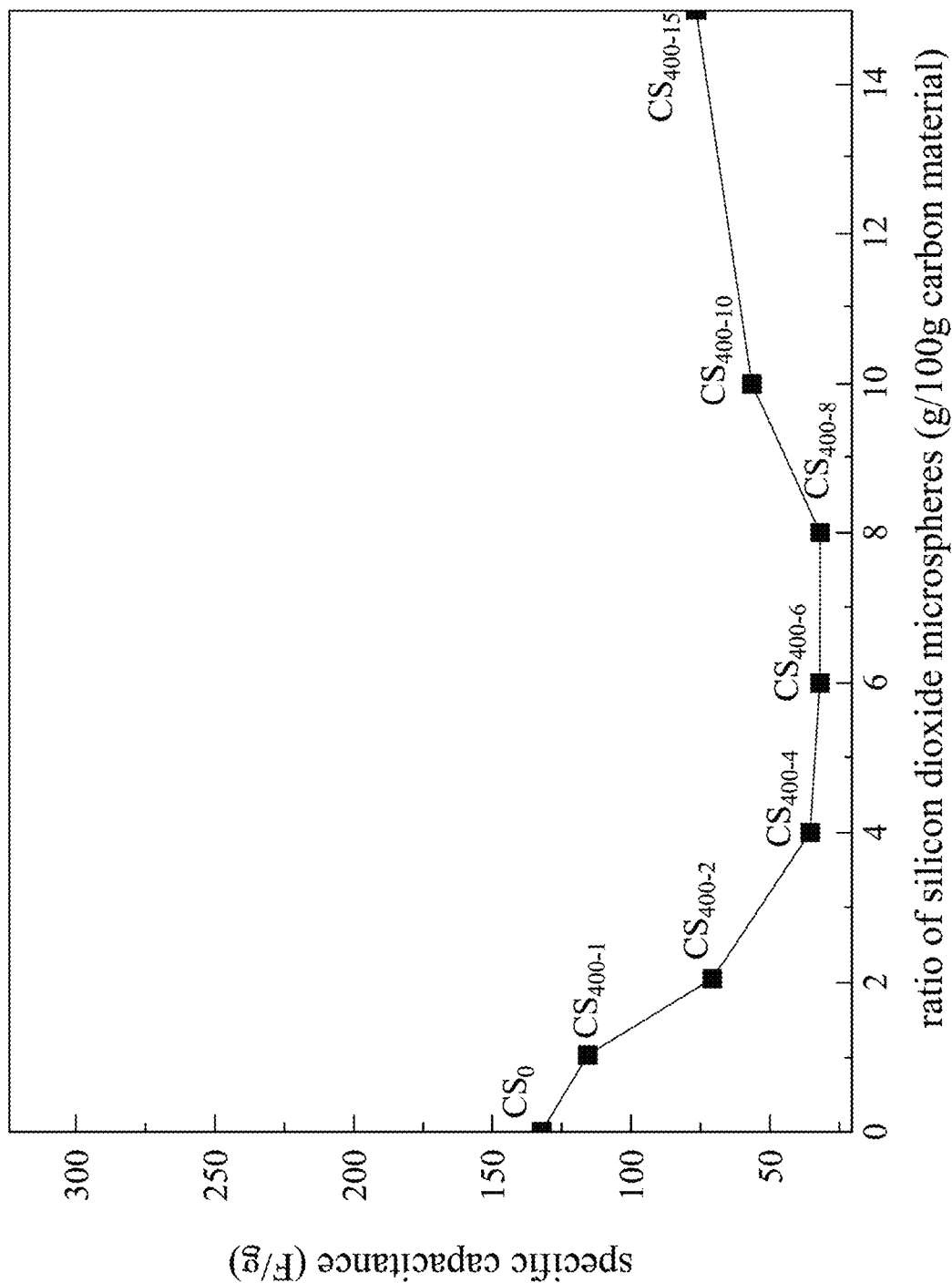
FIG. 6 is a graph showing the relationship between specific capacitances and ratios of silicon dioxide microspheres according to Test 4.

Please refer to FIG. 6. FIG. 6 is a graph showing the relationship between specific capacitances and ratios of silicon dioxide microspheres according to Test 4. From the result of Test 4, it is realized that the specific capacitances of the supercapacitor electrodes including silicon dioxide microsphere cannot be enhanced no matter how much silicon dioxide microspheres of 400 nm are added.

2. Capacitive Properties of Different Carbon Materials with Silicon Dioxide Microspheres A CMK-3 type mesoporous carbon material, a CMK-3 type mesoporous carbon material including cerium dioxide, a graphene material, a graphene material including manganese dioxide and an activated carbon material are selected as the carbon materials, in order to test the capacitive properties of different carbon materials with the silicon dioxide microspheres. Supercapacitor electrodes "without silicon dioxide microsphere" and "with silicon dioxide microspheres of 100 nm" are respectively fabricated from the abovementioned carbon materials for comparison.

2-1. Test 5: CMK-3 Type Mesoporous Carbon Material

Figure 7:
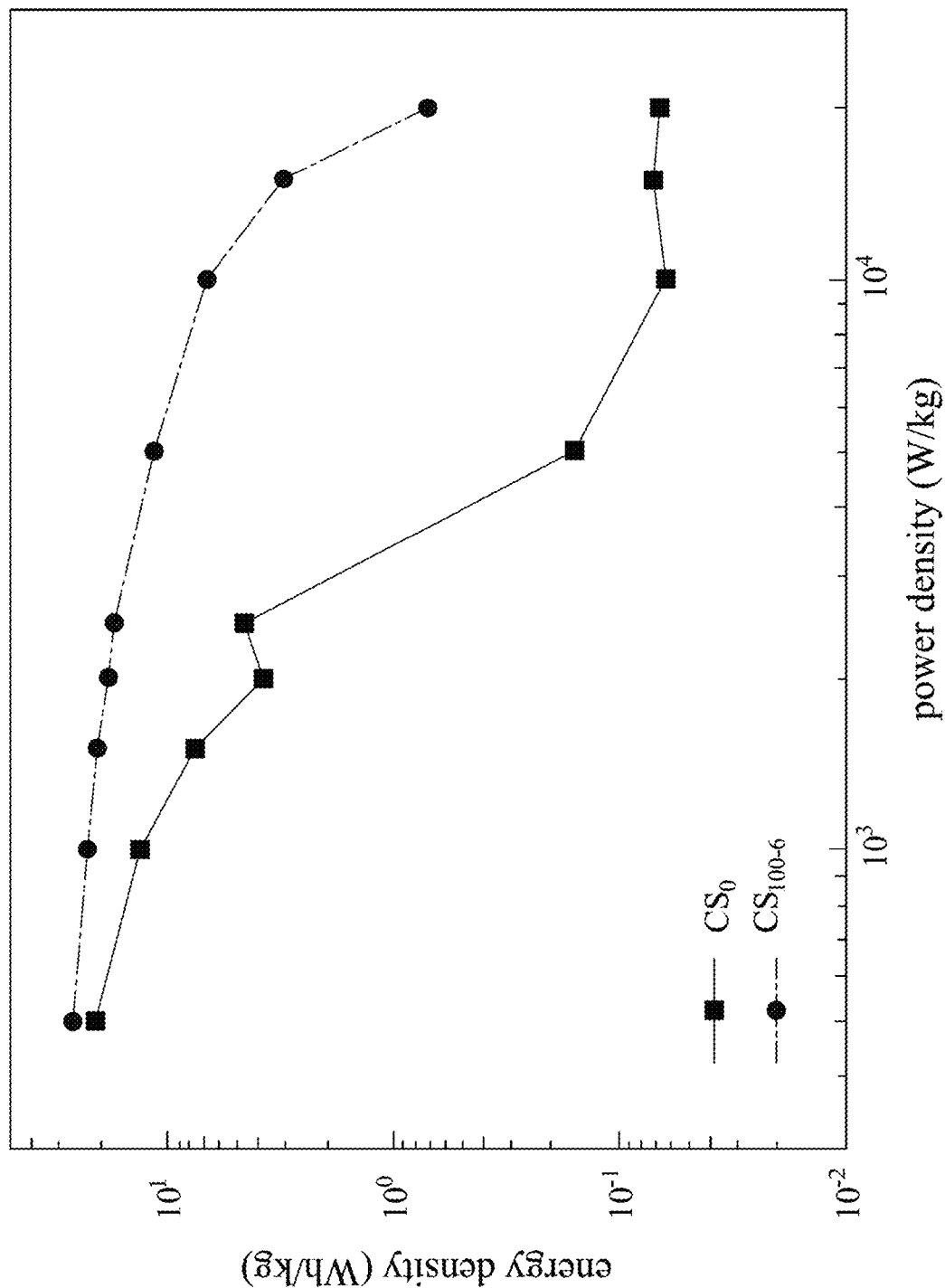
FIG. 7 is a graph showing the relationship between power density and energy density according to Test 5.

Comparison 1 (electrode $CS_0$) and Example 4 (electrode $CS_{100-6}$) are compared in Test 5. Please refer to FIG. 7. FIG. 7 is a graph showing the relationship between power density and energy density according to Test 5. It is understood that, when the carbon material is CMK-3 type mesoporous carbon material, the energy density and the power density of the supercapacitor electrode increase by adding the silicon dioxide microspheres. The descending degree of the energy density as the power density gradually increasing can be reduced due to the existence of the silicon dioxide microspheres.

Figure 8:
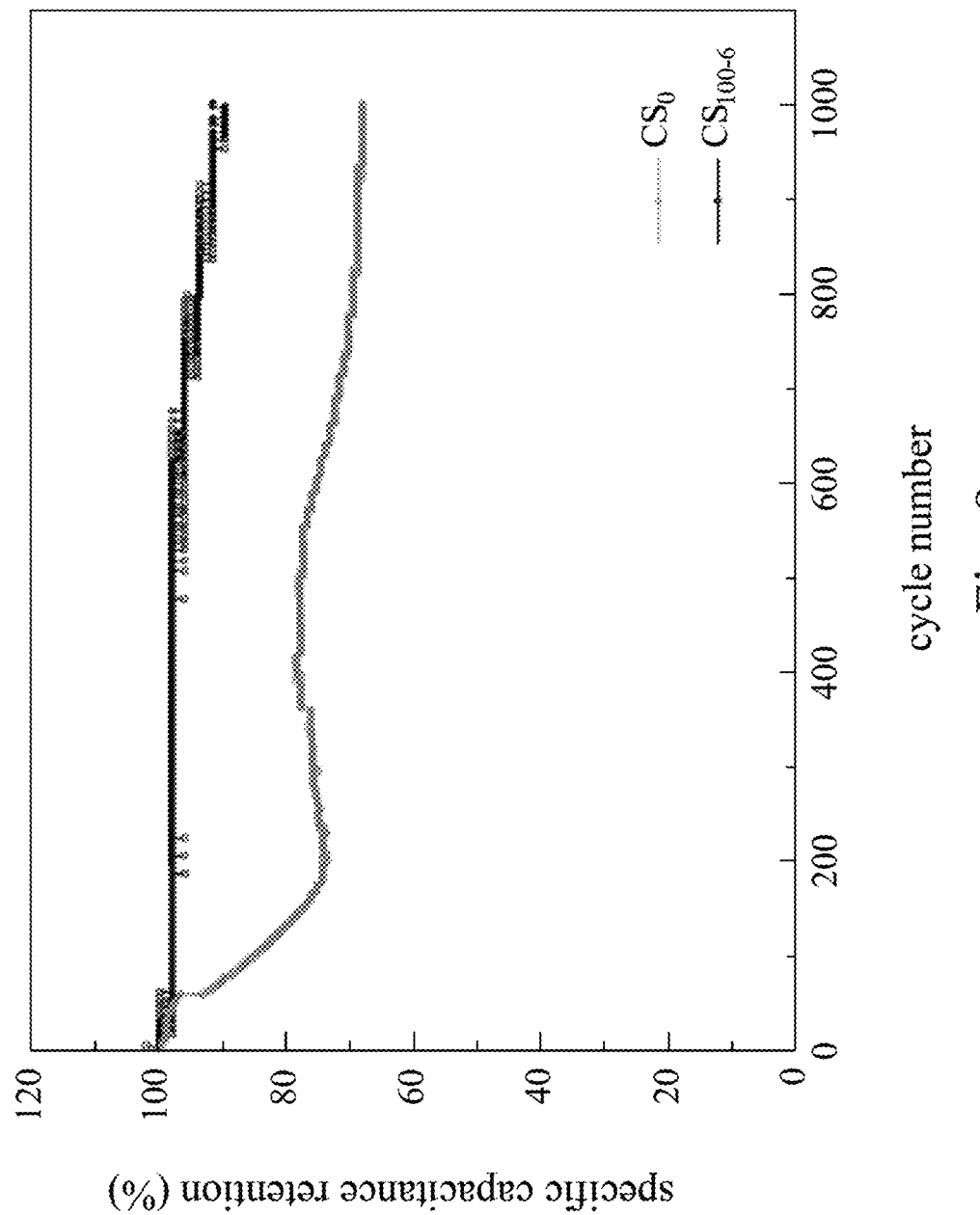
FIG. 8 is a graph showing the cyclic stability result according to Test 5.

Please also refer to FIG. 8. FIG. 8 is a graph showing the cyclic stability result according to Test 5. After 1000 cycles of charging and discharging, the specific capacitance of Comparison 1 decreases by 31.96%, where the specific capacitance of Example 4 decreases merely by 8.47%. Therefore, the capacitive stability of the supercapacitor electrode can be improved by adding the silicon dioxide microspheres to reduce the capacitive decay after multiple charging and discharging cycles.

2-2. Test 6: Mesoporous Carbon Material Including Cerium Dioxide

Figure 9:
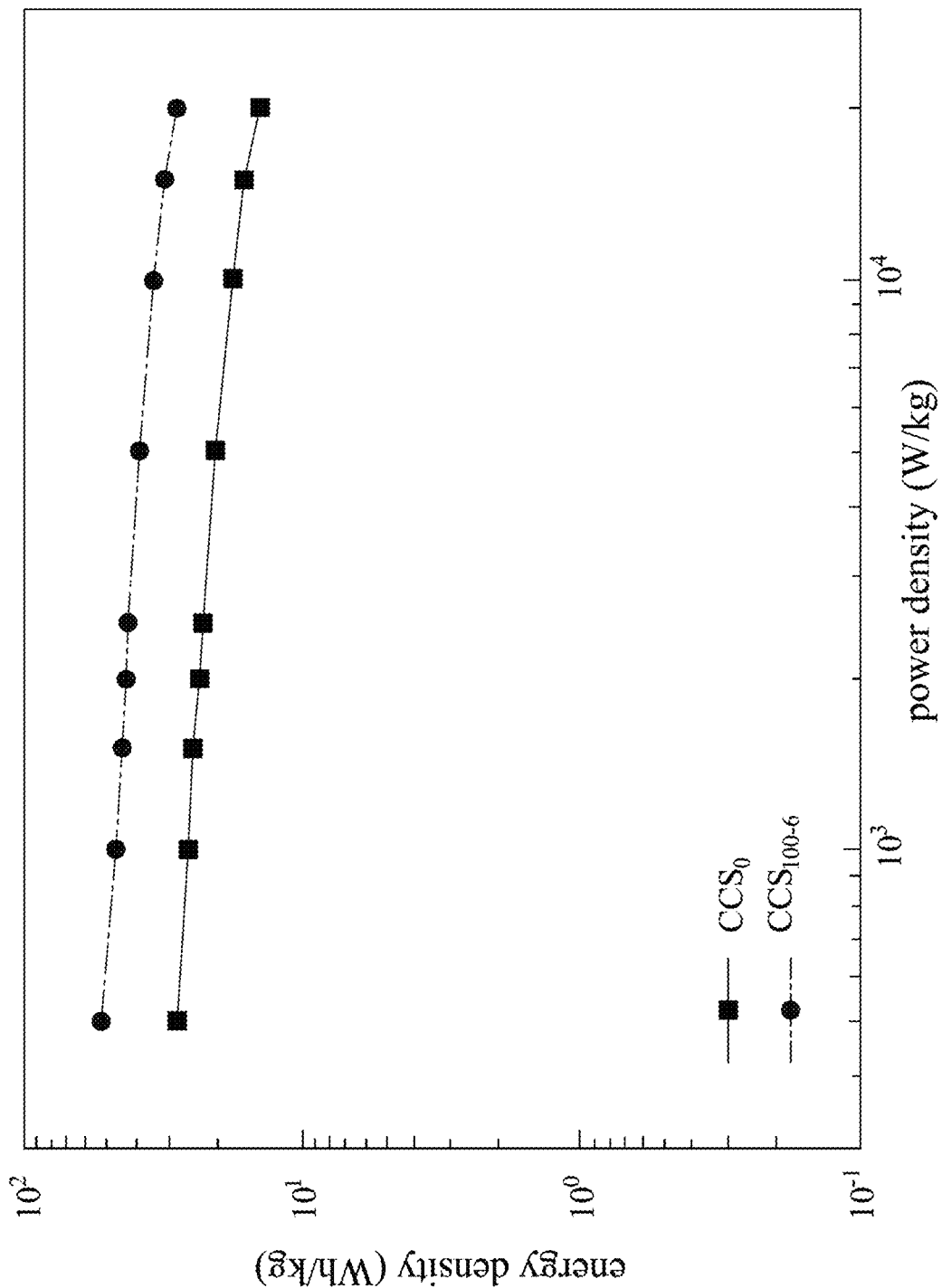
FIG. 9 is a graph showing the relationship between power density and energy density according to Test 6.

In Test 6, Comparison 9 is fabricated from the mesoporous carbon material including cerium dioxide without silicon dioxide microsphere (electrode $CCS_0$), and Example 22 is fabricated from the mesoporous carbon material including cerium dioxide with silicon dioxide microspheres of 100 nm (electrode $CCS_{100-6}$). The weight ratio of the silicon dioxide microspheres to the mesoporous carbon material including cerium dioxide is 6:100 for Example 22. Please refer to FIG. 9. FIG. 9 is a graph showing the relationship between power density and energy density according to Test 6. It is understood that, when the carbon material is mesoporous carbon material including cerium dioxide, the energy density and the power density of the supercapacitor electrode increase by adding the silicon dioxide microspheres.

2-3. Test 7: Graphene Material

Figure 10:
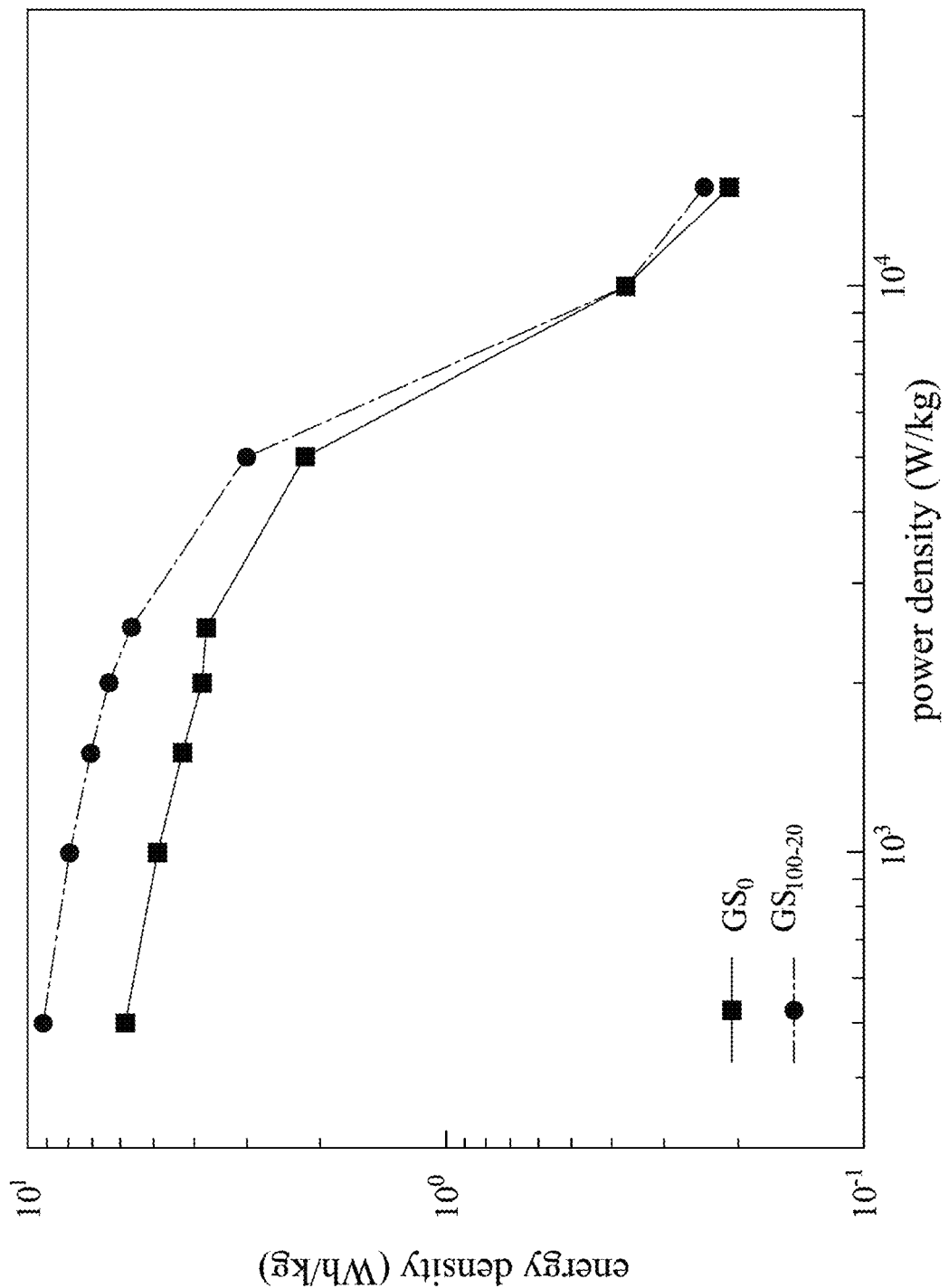
FIG. 10 is a graph showing the relationship between power density and energy density according to Test 7.

In Test 7, Comparison 10 is fabricated from the graphene material without silicon dioxide microsphere (electrode $GS_0$), and Example 23 is fabricated from the graphene material with silicon dioxide microspheres of 100 nm (electrode $GS_{100-2}$0. The weight ratio of the silicon dioxide microspheres to the graphene material is 20:100 for Example 23. Please refer to FIG. 10. FIG. 10 is a graph showing the relationship between power density and energy density according to Test 7. It is understood that, when the carbon material is graphene material, the energy density and the power density of the supercapacitor electrode increase by adding the silicon dioxide microspheres.

2-4. Test 8: Graphene Material Including Manganese Dioxide

Figure 11:
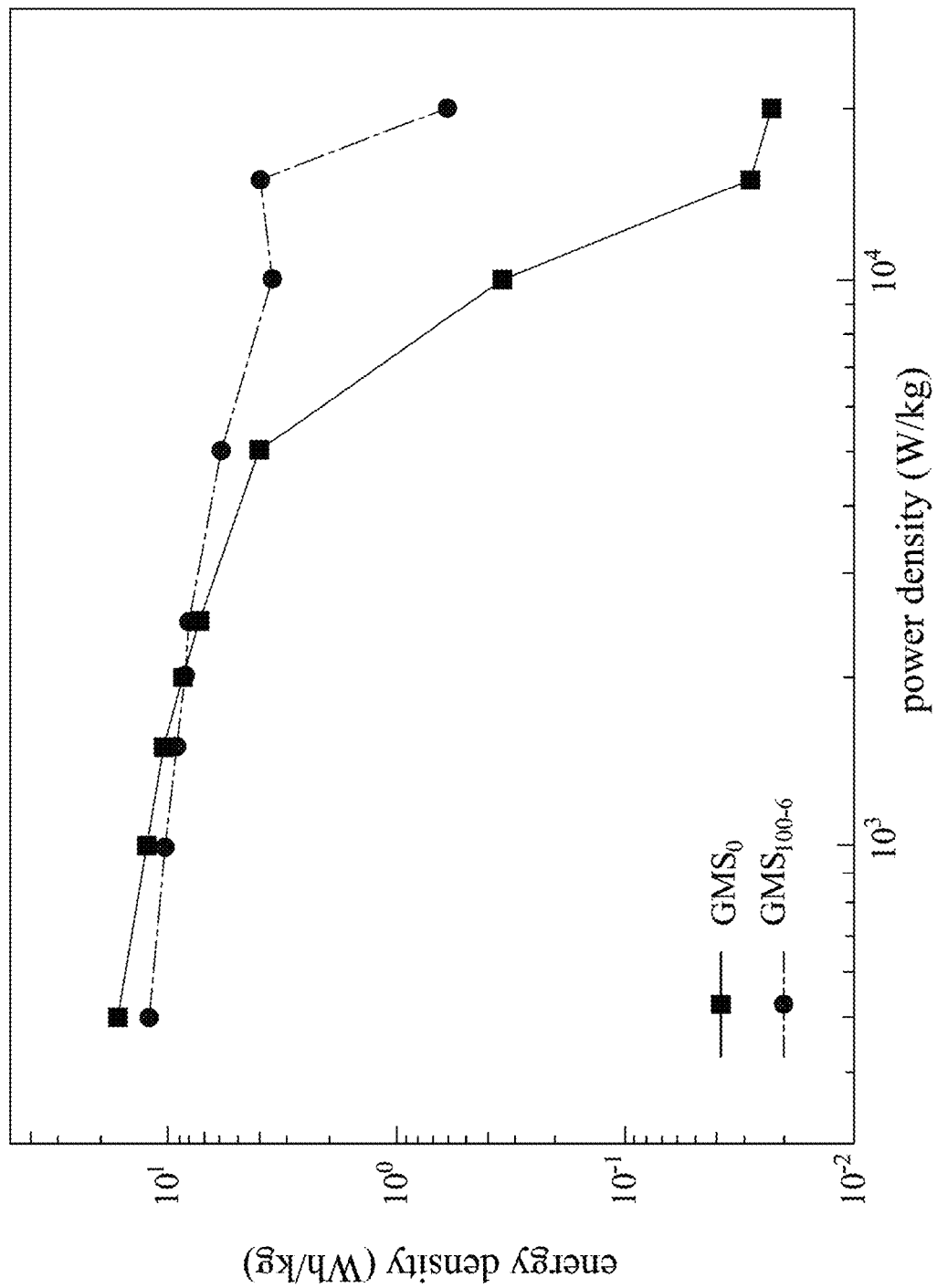
FIG. 11 is a graph showing the relationship between power density and energy density according to Test 8.

In Test 8, Comparison 11 is fabricated from the graphene material including manganese dioxide without silicon dioxide microsphere (electrode $GMS_0$), and Example 24 is fabricated from the graphene material including manganese dioxide with silicon dioxide microspheres of 100 nm (electrode $GMS_{100-6}$). The weight ratio of the silicon dioxide microspheres to the graphene material including manganese dioxide is 6:100 for Example 24. Please refer to FIG. 11. FIG. 11 is a graph showing the relationship between power density and energy density according to Test 8. It is understood that, when the carbon material is graphene material including manganese dioxide, the descending degree of the energy density as the power density gradually increasing can be reduced due to the existence of the silicon dioxide microspheres. Thus, the energy density of the supercapacitor electrode at high power density increases by adding the silicon dioxide microspheres.

2-5. Test 9: Activated Carbon Material

Figure 12:
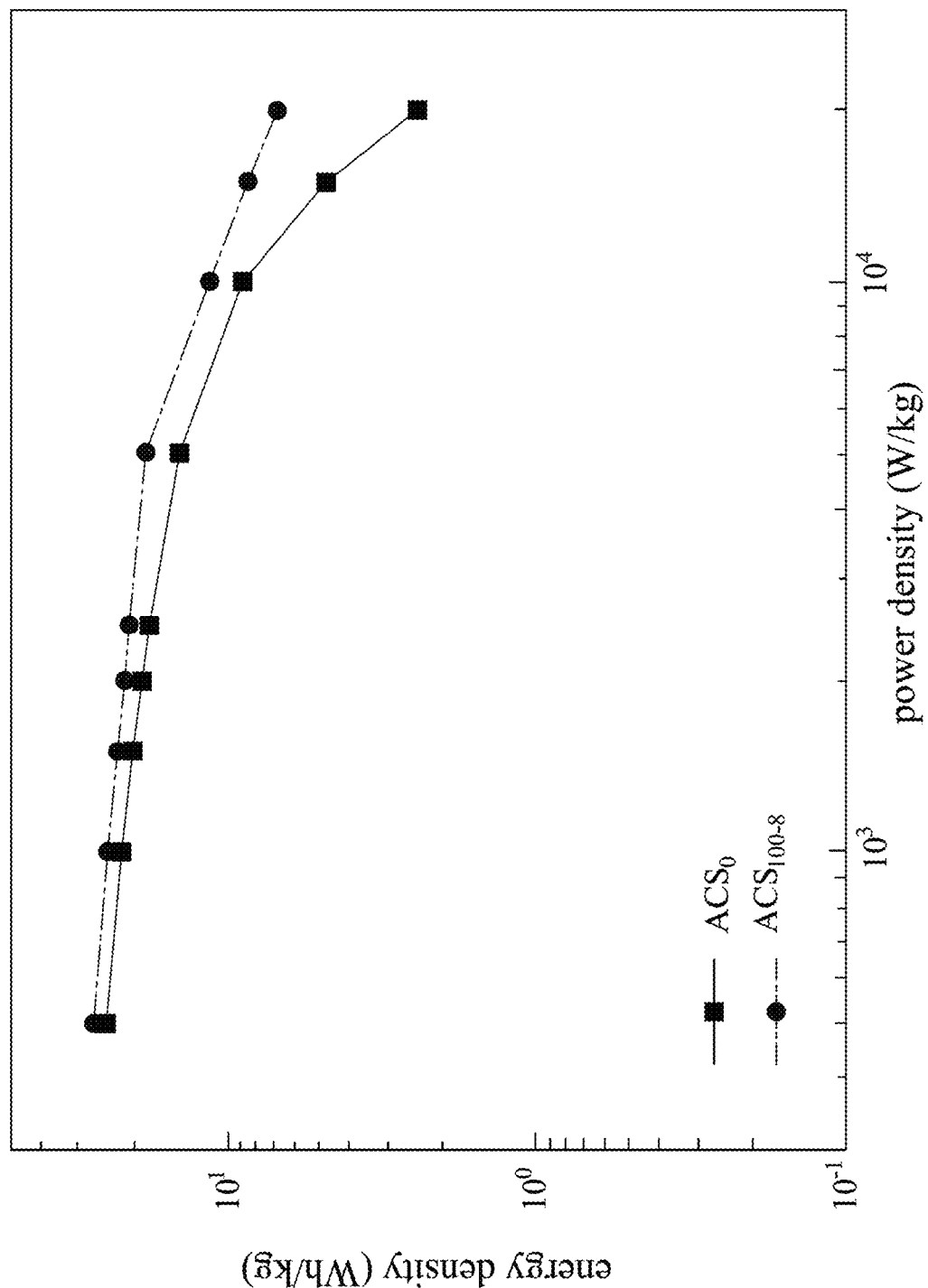
FIG. 12 is a graph showing the relationship between power density and energy density according to Test 9.

In Test 9, Comparison 12 is fabricated from the activated carbon material without silicon dioxide microsphere (electrode $ACS_0$), and Example 25 is fabricated from the activated carbon material with silicon dioxide microspheres of 100 nm (electrode $ACS_{100-8}$). The weight ratio of the silicon dioxide microspheres to the activated carbon material is 8:100 for Example 25. Please refer to FIG. 12. FIG. 12 is a graph showing the relationship between power density and energy density according to Test 9. It is understood that, when the carbon material is activated carbon material, the energy density and the power density of the supercapacitor electrode increase by adding the silicon dioxide microspheres, and the descending degree of the energy density as the power density gradually increasing can be reduced due to the existence of the silicon dioxide microspheres.

In summary, according to the fabrication method of the supercapacitor electrode including silicon dioxide microsphere based on the present disclosure, the affinity between the supercapacitor electrode and an electrolyte is enhanced by adding the silicon dioxide microspheres, which maintains the integrity of the supercapacitor electrode. Thus, properties such as capacitance, energy density, power density and capacitance retention of the supercapacitor electrode including silicon dioxide microsphere are improved.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A fabrication method of a supercapacitor electrode including silicon dioxide microsphere, comprising:
    providing a slurry comprising a plurality of silicon dioxide microspheres, a carbon material, a conductive agent, a binder and a solvent;
    performing a coating step to coat the slurry onto a substrate to form a coated piece; and
    performing a drying step to dry the coated piece to form the supercapacitor electrode including silicon dioxide microspheres;
    wherein the carbon material is a mesoporous carbon material including cerium dioxide, a diameter of each of the plurality of silicon dioxide microspheres is 100 nm, and a weight ratio of the plurality of silicon dioxide microspheres to the mesoporous carbon material including cerium dioxide is 6:100.

2. The fabrication method of the supercapacitor electrode including silicon dioxide microsphere of claim 1, wherein providing the slurry further comprises:
    performing a mixing step to add the plurality of silicon dioxide microspheres, the carbon material, the conductive agent and the binder into the solvent to form a mixture; and
    performing a dispersing step to stir and sonicate the mixture to form the slurry.

3. The fabrication method of the supercapacitor electrode including silicon dioxide microsphere of claim 2, wherein the mixture is stirred for 30 minutes and sonicated for 30 minutes under room temperature in the dispersing step.

4. The fabrication method of the supercapacitor electrode including silicon dioxide microsphere of claim 1, wherein the substrate is made of titanium.

* * * * *